US012429392B2

(12) United States Patent
Baldo et al.

(10) Patent No.: US 12,429,392 B2
(45) Date of Patent: Sep. 30, 2025

(54) LINEAR CAPACITIVE PRESSURE SENSOR

(71) Applicant: STMicroelectronics International N.V., Geneva (CH)

(72) Inventors: Lorenzo Baldo, Bareggio (IT); Filippo Daniele, Milan (IT); Enri Duqi, Milan (IT)

(73) Assignee: STMicroloelectronics International N.V., Geneva (CH)

( * ) Notice: Subject to any disclaimer, the term of this patent is extended or adjusted under 35 U.S.C. 154(b) by 342 days.

(21) Appl. No.: 18/117,070

(22) Filed: Mar. 3, 2023

(65) Prior Publication Data

US 2024/0295454 A1 Sep. 5, 2024

(51) Int. Cl.
*G01L 9/12* (2006.01)

(52) U.S. Cl.
CPC .............. *G01L 9/12* (2013.01); *G01L 9/125* (2013.01)

(58) Field of Classification Search
CPC .................................. G01L 9/12; G01L 9/125
See application file for complete search history.

(56) References Cited

U.S. PATENT DOCUMENTS

| 6,532,824 | B1 | 3/2003 | Ueno et al. |
| 7,398,688 | B2 * | 7/2008 | Zdeblick ............... G01L 9/065 73/700 |
| 8,966,990 | B2 * | 3/2015 | Clark ..................... G01P 15/125 361/283.4 |
| 2002/0127760 | A1 | 9/2002 | Yeh et al. |
| 2006/0201249 | A1 | 9/2006 | Horning et al. |
| 2020/0407218 | A1 * | 12/2020 | Chodavarapu ....... H03H 9/0557 |

FOREIGN PATENT DOCUMENTS

WO 2012003403 A2 1/2012

OTHER PUBLICATIONS

Xie, Huikai, et al.: "Vertical Comb-Finger Capacitive Actuation and Sensing for CMOS-MEMS," Sensors and Actuators A 95 (2002) 212-221.

* cited by examiner

*Primary Examiner* — Herbert K Roberts
(74) *Attorney, Agent, or Firm* — Crowe & Dunlevy

(57) ABSTRACT

A pressure-sensor includes a substrate with a cavity therein and a membrane suspended over the cavity. The cavity is connected to external air pressure so a change in external air pressure causes out-of-plane movement of the membrane. A frame suspended over the membrane includes a segment connected to the membrane but disconnected from other frame portions. A projection extends from the frame. A first spring is connected to the projection, a second spring is connected to the segment, and an end portion connects the springs so out-of-plane movement of the membrane applies out-of-plane force to the second spring, which is transferred to the first spring by the end portion and translated to an in-plane force by the first spring and applied to the projection. This causes lateral sliding movement of the frame with respect to the substrate. A capacitive-sensor detects sliding movement of the frame with respect to the substrate.

17 Claims, 10 Drawing Sheets

LINEAR CAPACITIVE PRESSURE SENSOR

TECHNICAL FIELD

This disclosure is directed to the field of capacitive pressure sensors and, more particularly, to a capacitive pressure sensor design that provides for a linear output across a range of pressures.

BACKGROUND

Pressure sensors formed utilizing microelectromechanical systems (MEMS) technology are widely utilized in electronic devices. One known MEMS pressure sensor is shown in FIG. 1A and includes a sensor body 1 having sidewalls 5 extending upwardly from a base 2 to define a cavity, with a membrane 4 extending between the sidewalls 5 to seal the cavity. A bottom electrode 3 is carried by the base 2 within the cavity. A positive pressure differential between the pressure within the cavity and the pressure of the external environment results in the membrane 4 being urged downwardly toward the electrode 3, changing the capacitance between the electrode 3 and a conductive layer within the membrane 4. By measuring this capacitance and comparing it to a reference value, the external air pressure can ultimately be estimated.

To do this, a second sensor body 10 shown in FIG. 1B. is utilized. This sensor body 10 has sidewalls 15 extending upwardly from a base 12 to define a cavity, with a rigid ceiling 11 extending between the sidewalls 15 to seal the cavity. Here as well, a bottom electrode 13 is carried by the bass 12 within the cavity. Since this second sensor body 10 lacks a membrane and instead has the rigid ceiling 11 extending between the sidewalls 15, the capacitance between the electrode 13 and a conductive layer within the rigid ceiling 11 does not change with external air pressure as the pressure differential between the cavity and the external environment does not result in the movement of the rigid ceiling 22. An application specific integrated circuit (ASIC) 17 shown in FIG. 1C compares the sense and reference capacitances to thereby produce a voltage Voutp that is generally indicative of the external air pressure.

While this output voltage Voutp does provide a useful estimate of the external air pressure, notice that the capacitance change in the sensor 1 is non-linear across a range of temperatures, as shown in the graph of capacitance vs pressure shown in FIG. 1D. This is due to the nature of parallel plate capacitors, as well as due to the displacement of the membrane 4 due to air pressure being greater at the center of the membrane 4 than at the periphery of the membrane 4.

In an attempt to reduce this non-linearity, the membrane 4 may be constructed to be relatively rigid, thereby reducing the displacement thereof under pressure. While this is somewhat effective in reducing non-linearity (as the greater the displacement, the greater the non-linearity), it reduces the sensitivity and therefore overall accuracy. Moreover, the use of the second sensor body 10 to provide for the reference capacitance Cref consumes an undesirable amount of area. As such, further development is needed.

SUMMARY

Disclosed herein is a pressure sensor, including: a substrate having a cavity defined therein; a membrane suspended over the cavity; a passage connecting the cavity to external air pressure such that a change in external air pressure causes out-of-plane movement of the membrane; and a frame slidably suspended over the membrane.

The frame includes a segment mechanically connected to the membrane and directly mechanically disconnected from other portions of the frame, and at least one projection extending from the frame. At least one spring structure is mechanically connected to the at least one projection and the segment, wherein out-of-plane movement of the membrane applies an out-of-plane force to the at least one spring structure which in turns translates the out-of-plane force to an in-plane force applied to the frame to thereby cause lateral sliding movement of the frame with respect to the substrate. A capacitive sensor associated with the frame for detecting sliding in-plane movement of the frame with respect to the substrate.

The at least one spring structure may include a first spring mechanically connected to the at least one projection, a second spring mechanically connected to the segment, and an end portion connecting the first and second springs such that out-of-plane movement of the membrane applies an out-of-plane force to the second spring, the out-of-plane force applied to the second spring in turn being transferred to the first spring by the end portion, the out-of-plane force transferred to the first spring being translated to in-plane force by the first spring and applied to the at least one projection and therefore the frame, the application of the in-plane force to the frame causing lateral sliding movement of the frame with respect to the substrate.

At least one anchored spring is anchored to the substrate and extends over the membrane in a spaced apart fashion thereto to be mechanically connected to the at least one projection, the at least one anchored spring serving to constrain the frame from out-of-plane movement.

The first spring may include: a central spring element; a first side spring element mechanically connected to a first side of the central spring element, the first side spring element extending along the first side of the central spring element from a bottom of the central spring element toward but not reaching a top of the central spring element; and a second side spring element mechanically connected to a second side of the central spring element opposite to the first side, the second side spring element extending along the second side of the central spring element from the top of the central spring element toward but not reaching the bottom of the central spring element.

The first side spring element may extend from the bottom of the central spring element toward and reaching a midpoint of the central spring element along a latitudinal axis of the central spring element, and the second side spring element may extend from the top of the central spring element toward and reaching the midpoint of the central spring element along the latitudinal axis of the central spring element.

The capacitive sensor may include a first conductive comb fixedly carried by the frame, and a first plurality of conductive fingers fixedly carried by the frame and interdigitated with the first conductive comb such that lateral sliding movement of the frame with respect to the substrate changes an overlap area between the first conductive comb and the first plurality of conductive fingers. A first capacitance between the first conductive comb and first plurality of conductive fingers may be based upon the out-of-plane movement of the membrane caused by the external air pressure.

Lateral sliding movement of the frame with respect to the substrate in a first direction may increase the overlap area between the first conductive comb and the first plurality of conductive fingers.

A second conductive comb may be fixedly carried by the membrane, and a second plurality of conductive fingers may be fixedly carried by the frame and interdigitated with the first conductive comb such that lateral sliding movement of the frame with respect to the substrate in a second direction opposite to the first direction reduces an overlap area between the second conductive comb and the second plurality of conductive fingers.

A second capacitance between the second conductive comb and the second plurality of conductive fingers may be based upon the out-of-plane movement of the membrane caused by the external air pressure. The first and second capacitances may form a differential capacitance output indicative of the external air pressure.

The frame may include at least one interior portion and at least one exterior portion. The first conductive comb may be fixedly carried by the membrane at a location within the at least one exterior portion of the frame. The first plurality of conductive fingers may extend outwardly from an interior sidewall of the at least one exterior portion toward the first conductive comb.

The segment may form part of an interior sidewall of the at least one interior portion of the frame. The at least one projection may extend inwardly from an interior sidewall of the at least one interior portion of the frame. The at least one spring structure may be located within the at least one interior portion of the frame.

The at least one spring structure may include a first spring mechanically connected to the at least one projection, a second spring mechanically connected to the segment, and an end portion connecting the first and second springs such that out-of-plane movement of the membrane applies an out-of-plane force to the second spring, the out-of-plane force applied to the second spring in turn being transferred to the first spring by the end portion, the out-of-plane force transferred to the first spring being translated to in-plane force by the first spring and applied to the at least one projection and therefore the frame, the application of the in-plane force to the frame causing lateral sliding movement of the frame with respect to the substrate. The second spring may be mechanically connected to the segment, and the first spring is mechanically connected to the at least one projection.

A cap may be positioned over the frame and environmentally seal the frame and underlying portions from external air, the passage including an opening outside of the cap and exposed to external air.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1A:
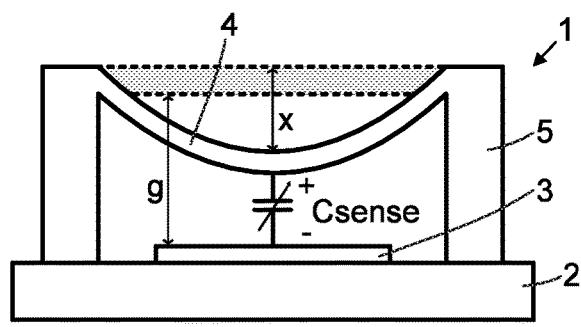
FIG. 1A is a diagrammatical view of a prior art parallel plate capacitor-based pressure sensor.
Figure 1C:
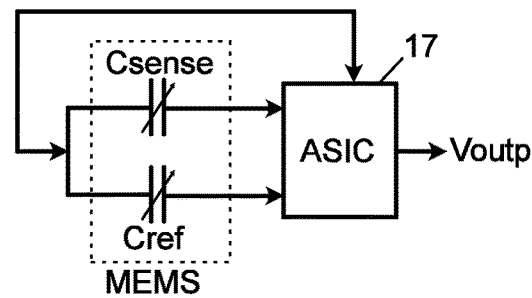
FIG. 1C is a schematic diagram of readout circuit for the prior art pressure sensors of FIGS. 1A-1B.
Figure 1B:
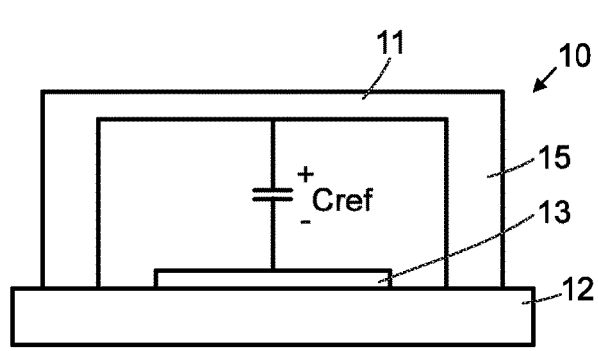
FIG. 1B is a diagrammatical view of a prior art parallel plate capacitor-based reference pressure sensor.
Figure 1D:
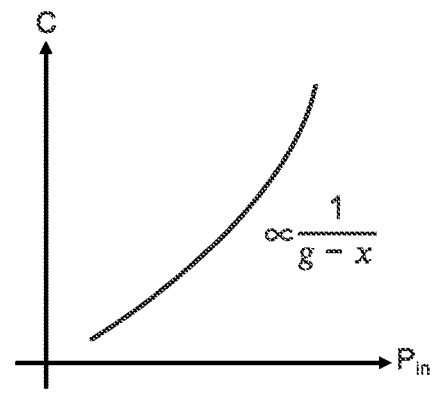
FIG. 1D is a graph of capacitance vs pressure for the prior art pressure sensor of FIG. 1A.
Figure 2:
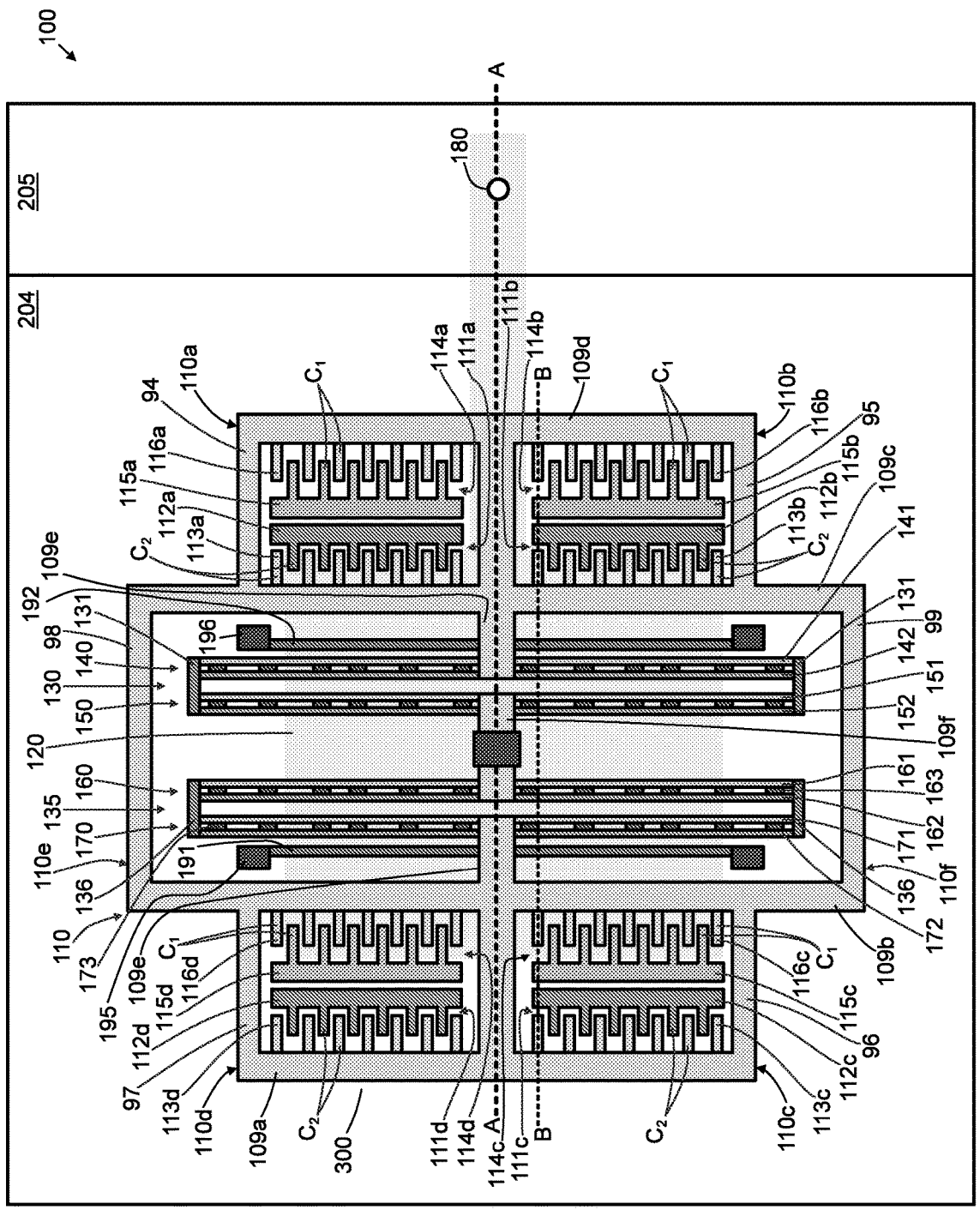
FIG. 2 is a diagrammatical top view of a pressure sensor described herein.

Now described with initial reference to the top-down view in FIG. 2 is a pressure sensor 100 which may be formed using microelectromechanical systems (MEMS) technology with suitable processes, for example using the processes described in European Patent Application EP1577656, the contents of which are incorporated by reference in their entirety.

The pressure sensor 100 includes a substrate 300 with a sealed cavity 204 and an open cavity 205. A frame 110 is within the sealed cavity and is slidably coupled with respect to substrate 300, and spanning across membrane 120. The frame 110 includes a rectangularly shaped first inner frame portion 110e and a rectangularly shaped second inner frame portion 110f. The frame 110 also includes outer frame portions 110a, 110b, 110c, and 100d arranged about the exterior of the inner frame portions 110e and 110f.

The inner frame portions 110e and 110f share sidewalls 109b, 109c, and 109e/109f. In particular, inner frame portion 110e is formed by opposing end sidewalls 98 and 109e/109f and opposing side sidewalls 109b and 109c, while inner frame portion 110f is formed by opposing end sidewalls 99 and 109e/109f and opposing side sidewalls 109b and 109c.

Figure 3:
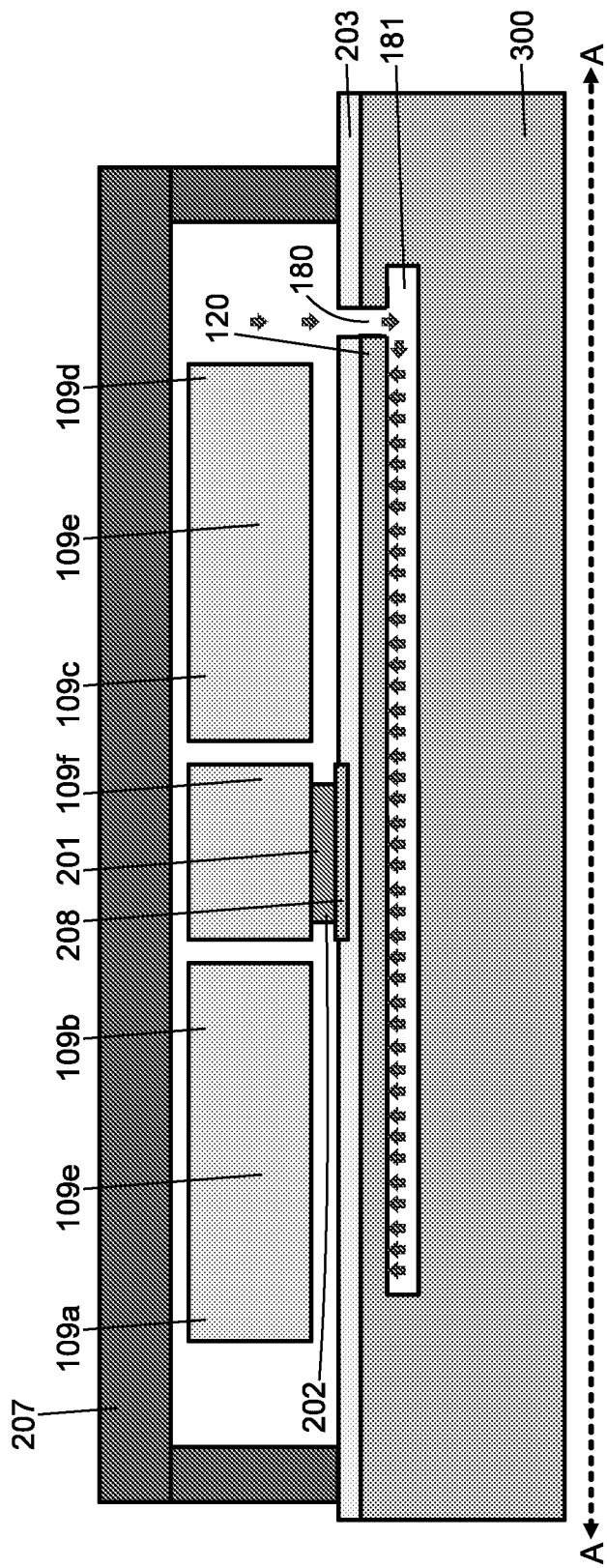
FIG. 3 is a cross sectional view of the pressure sensor of FIG. 2 taken along line A-AI.

Referring additionally to FIG. 3, showing a cross section through the line A-A, note the membrane 120 suspended over chamber 181, with frame 110 spanning across the membrane 120. Observe piston 201 directly mechanically connecting membrane 120 to the central segment 109f of sidewall 109e and electrically isolated from the membrane 120 through an oxide layer 203. A polysilicon interconnection layer 208 is within or withon the oxide layer 23. A top cap 207 is carried by the oxide layer 203 and spans over the frame 110 to provide for the sealed cavity 204.

The chamber 181 is fluidly connected to the external atmosphere via hole 180 in the open cavity 205 by portions of the chamber 181. Since the frame 110 spans across the membrane 120 without reaching the hole 180, and since the exterior of the frame 110 is environmentally sealed (by being in the sealed cavity 204, which may be maintained at vacuum) from the chamber 181 (which is fluidically connected to the external environment by hole 180) the differential between the vacuum of the chamber 181 and the external air pressure results in upward movement of the membrane 120, which in turn results in upward movement of the sidewall 109e by the action of the piston 201 pushing upwardly on the central segment 109f of the sidewall 109e. As will be explained in detail below, this upward movement is translated into lateral movement of the frame 110 with respect to the substrate 300, and this lateral movement is measured via comb finger capacitors 111a-111d, 114a-114d, thereby providing for measurable readings indicative of the pressure of the air external to the pressure sensor 100.

Returning now to FIG. 2, the outer frame portion 110a is formed by opposing end sidewalls 94 and 109e and opposing side sidewalls 109c and 109d, while the outer frame portion 110b is formed by opposing end sidewalls 95 and 109e and opposing side sidewalls 109c and 109d. The outer frame portion 110c is formed by opposing end sidewalls 96 and 109e and opposing side sidewalls 109b and 109a, while the outer frame portion 110d is formed by opposing end sidewalls and opposing side sidewalls 109b and 109a.

A first spring structure 130 extends longitudinally across the inner frame portions 110e and 110f, between sidewalls 98 and 99, adjacent sidewall 109c. A second spring structure 135 likewise extends longitudinally across the inner frame portions 110e and 110f, between sidewalls 98 and 90, adjacent sidewall 109b. First anchors 191 are mechanically connected to the underlying substrate 300 and spring portions 195 extend from each anchor 191 toward and making contact with the central segment 109f. Second anchors 192 are mechanically connected to the underlying substrate 300 and spring portions 196 extend from each anchor 192 toward and making contact with the central segment 109f. As will be explained, the spring portions 195 and 196 serve to permit in-plane movement of the frame 110 with respect to the underlying substrate 300, while constraining the frame 110 from out-of-plane movement.

The first spring structure 130 includes end portions 131, with first spring 140 and second spring 150 extending between and mechanically attached to the end portions 131. The first spring 140 is bisected by and mechanically connected to projection 109e extending inwardly from sidewall 109c toward sidewall 109b. The second spring 150 is bisected by and mechanically connected to central segment 109f. The mechanical connection of the first spring 140 and second spring 150 to the bisecting central segment 109f serves to suspend the springs 140, 150 over the membrane 120.

Figure 4:
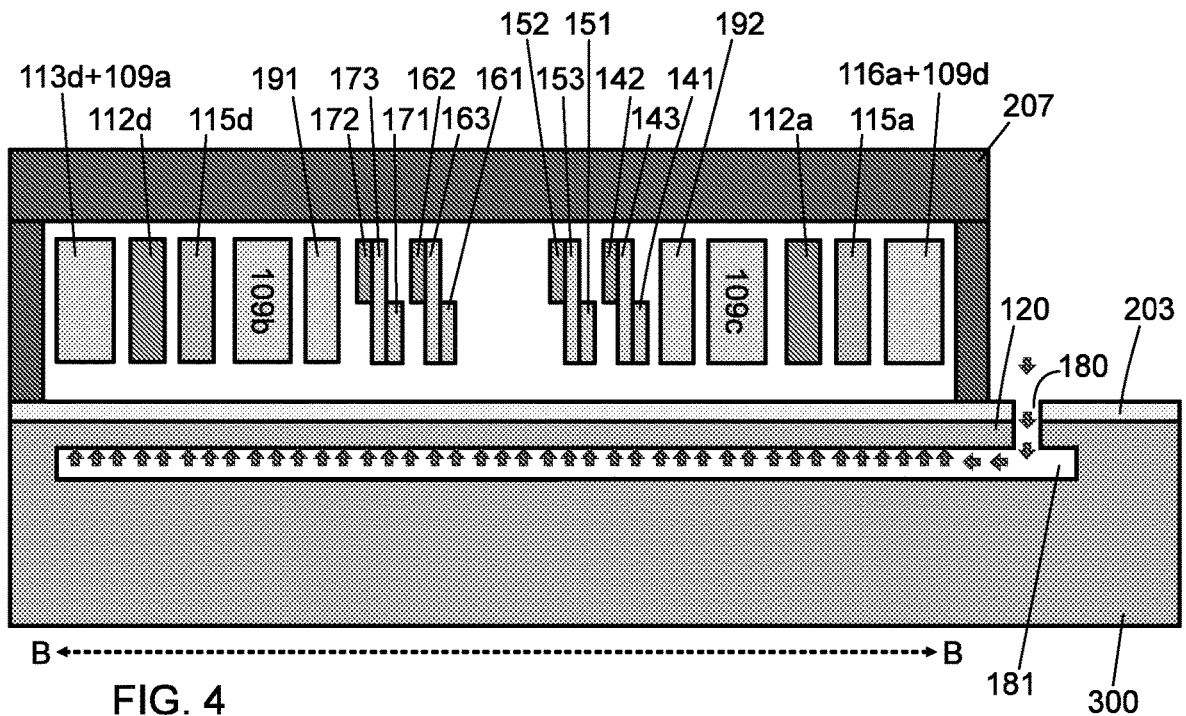
FIG. 4 is a cross sectional view of the pressure sensor of FIG. 2 taken along line B-B.
Figure 5:
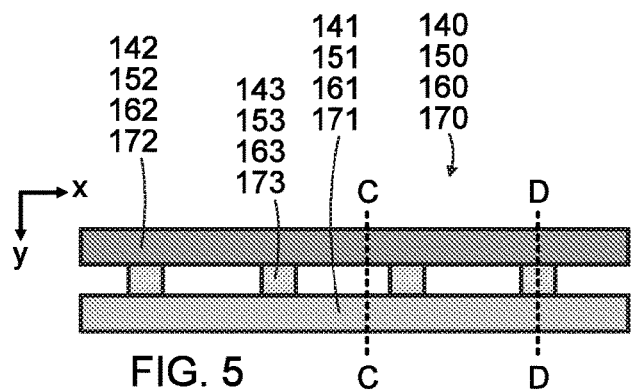
FIG. 5 is a greatly enlarged top view of the spring structures of the pressure sensor of FIG. 2.
Figures 6, 7:
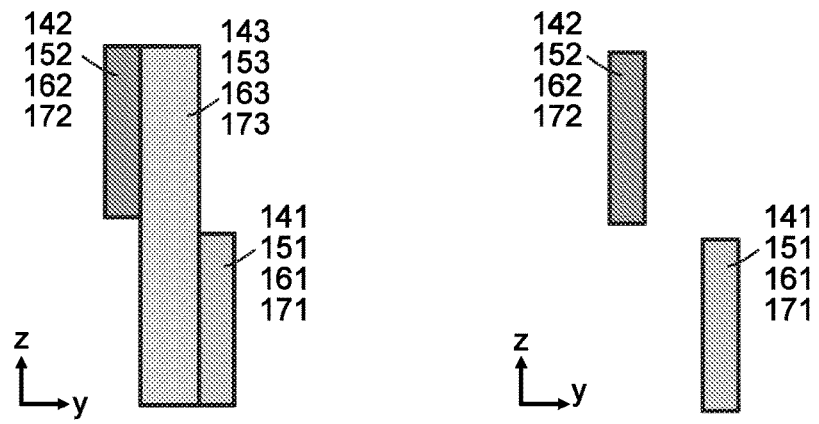
FIG. 6 is a cross sectional view of the spring structures of FIG. 5 taken along lines C-C.
FIG. 7 is a cross sectional view of the spring structures of FIG. 5 taken along lines D-D.

The structure of the first spring structure 130 and second spring structure 135 in relation to the frame 110 can be further observed in cross-section in FIG. 4, a cross-sectional view of the sensor 100 taken along line B-B. An enlarged top view of the first spring structure 130 and second spring structure 135 can be observed in FIG. 5, and further cross-sectional views along lines C-C and D-D are shown in FIGS. 6-7, respectively.

Referring therefore to FIGS. 2 and 4-7, the first spring 140 extends longitudinally along its x-axis between end portions 131 and is bisected by projection 109e as explained above. The first spring 140 includes a central spring element 143 sandwiched between side spring elements 141 and 142, each of which extends along the entire x-axis of the first spring 140. However, while the central spring element 143 extends along the entire z-axis of the first spring 140, the side spring elements 141 and 142 do not. In particular, side spring element 141 extends along the z-axis from a bottom end of the central spring element 143 to a mid-point of the central spring element 143, while side spring element 142 extends from a top end of the central spring element 143 to the mid-point of the central spring element 143. The effect of this design of the first spring 140 is to transform forces applied to the first spring 140 along the z-direction into forces applied by the spring 140 along the y-direction.

The second spring 150 is constructed similarly to the first spring 140. In greater detail, the second spring 150 extends longitudinally along its x-axis between end portions 131 and is bisected by central segment 109f as described above. The second spring 150 includes a central spring element 153 sandwiched between side spring elements 151 and 152, each of which extends along the entire x-axis of the second spring 150. While the central spring element 153 extends along the entire z-axis of the second spring 150, the side spring elements 151 and 152 do not. In particular, side spring element 151 extends along the z-axis from a bottom end of the central spring element 153 to a mid-point of the central spring element 153, while side spring element 152 extends from a top end of the central spring element 153 to the mid-point of the central spring element 153. The functionality of the second spring 150 in transforming forces applied thereto in the z-direction into forces applied thereby in the y-direction is the same as the first spring 140.

The end portions 131 serve to pass forces applied thereto in the z-direction and y-direction by the second spring 150 to the first spring 140. Therefore, movement of the central segment 109f in the z-direction (e.g., upward or downward, resulting from movement of the membrane 120) applies forces in the z-direction to the second spring 150, these forces are passed by the end portions 131 to the first spring 140, and the first spring 140 transforms these forces into forces along the y-direction to thereby slide the frame 110 with respect to the substrate 300. This adjusts the comb-finger capacitors 111a-111d, 114a-114d to thereby detect movement of the membrane 120 in the z-direction (e.g., upward or downward).

The second spring structure 135 includes end portions 136, with third spring 160 and fourth spring 170 extending between and mechanically attached to the end portions 136. The fourth spring 170 is bisected by and mechanically connected to projection 109e extending inwardly from sidewall 109b toward sidewall 109c. The third spring 160 is bisected by and mechanically connected to central segment 109f.

The third spring 160 extends longitudinally along its x-axis between end portions 136 and is bisected by central segment 109f. The third spring 160 includes a central spring element 163 sandwiched between side spring elements 161 and 162, each of which extends along the entire x-axis of the third spring 160. While the central spring element 163 extends along the entire z-axis of the third spring 160, the side spring elements 161 and 162 do not. Side spring element 161 extends along the z-axis from a bottom end of the central spring element 163 to a mid-point of the central spring element 163, while side spring element 162 extends from a top end of the central spring element 163 to the mid-point of the central spring element 163. The functionality of the third spring 150 in transforming forces applied thereto in the z-direction into forces applied thereby in the y-direction is the same as the first spring 140.

The fourth spring 170 extends longitudinally along its x-axis between end portions 136 and is bisected by projection 109e. The fourth spring 170 includes a central spring element 173 sandwiched between side spring elements 171 and 172, each of which extends along the entire x-axis of the fourth spring 170. While the central spring element 173 extends along the entire z-axis of the fourth spring 170, the side spring elements 171 and 172 do not. Side spring element 171 extends along the z-axis from a bottom end of the central spring element 173 to a mid-point of the central spring element 173, while side spring element 172 extends from a top end of the central spring element 173 to the mid-point of the central spring element 173. The functionality of the fourth spring 170 in transforming forces applied thereto in the z-direction into forces applied thereby in the y-direction is the same as the first spring 140.

The end portions 136 serve to pass forces applied thereto in the z-direction and y-direction by the third spring 160 to the fourth spring 170. Therefore, movement of the central segment 109f in the z-direction (e.g., upward or downward) applies forces in the z-direction to the third spring 160, these forces are passed by the end portions 136 to the fourth spring 170, and the fourth spring 160 transforms these forces into forces along the y-direction to thereby slide the frame 110 with respect to the substrate 300.

A first comb capacitor 111a is contained within the outer frame portion 110a adjacent sidewall 109c and a second comb capacitor 114a is contained within the outer frame portion 110a adjacent sidewall 109d.

The first comb capacitor 111a includes a first comb structure 112a spaced apart from the sidewall 109c and first fingers 113a extending from the sidewall 109c toward the first comb structure 112a and interlaced therewith. The first comb structure 112a is fixedly carried atop the substrate 300. The capacitance of the first comb capacitor 111a is set by the area overlap between adjacent ones the first fingers 113a and comb-fingers of the first comb structure 112a. The farther the first comb structure 112a is from the sidewall 109c, the less the capacitance between the first comb structure 112a and the first fingers 113a—the less the capacitance of the first comb capacitor 111a. Conversely, the closer the first comb structure 112a is to the sidewall 109c, the greater the capacitance between the first comb structure 111a and the first fingers 113a—the greater the capacitance of the first comb capacitor 111a.

The second comb capacitor 114a includes a second comb structure 115a spaced apart from the sidewall 109d and second fingers 116a extending from the sidewall 109d toward the second comb structure 115a and interleaved therewith. The second comb structure 115a is fixedly carried atop the substrate 300. The capacitance of the second comb capacitor 114a is set by the area overlap between adjacent ones the second fingers 116a and comb-fingers of the second comb structure 115a. The farther the second comb structure 115a is from the sidewall 109d, the less the capacitance between the second comb structure 115a and the second fingers 116a—the less the capacitance of the second comb capacitor 114a.

The differential between the capacitance C1 of the first comb capacitor 111a and capacitance C2 of the second comb capacitor 114a is an output indicative of the amount of the upward or downward movement of the membrane 120. This differential between C1 and C2 varies linearly with the displacement of the membrane 120 in the z-direction and therefore varies linearly with atmospheric pressure being sensed by the pressure sensor 100.

A third comb capacitor 111b is contained within the outer frame portion 110b adjacent sidewall 109c and a fourth comb capacitor 114b is contained within the outer frame portion 110b adjacent sidewall 109d.

The third comb capacitor 111b includes a third comb structure 112b spaced apart from the sidewall 109c and third fingers 113b extending from the sidewall 109c toward the third comb structure 112b and interlaced therewith. The third comb structure 112b is fixedly carried atop the substrate 300. The capacitance of the third comb capacitor 111b is set by the area overlap between adjacent ones the third fingers 113b and comb-fingers of the third comb structure 112b. The farther the third comb structure 112b is from the sidewall 109c, the less the capacitance between the third comb structure 111b and the third fingers 113b—the less the capacitance of the third comb capacitor 111b. Conversely, the closer the third comb structure 112b is to the sidewall 109c, the greater the capacitance between the third comb structure 111b and the third finger 113b—the greater the capacitance of the third comb capacitor 111b.

The fourth comb capacitor 114b includes a fourth comb structure 115b spaced apart from the sidewall 109d and fourth fingers 116b extending from the sidewall 109d toward the fourth comb structure 115b and interlaced therewith. The fourth comb structure 115b is fixedly carried atop the substrate 300. The capacitance of the fourth comb capacitor 114b is set by the area overlap between adjacent ones the fourth fingers 116b and comb-fingers of the fourth comb structure 115b. The farther the fourth comb structure 115b is from the sidewall 109d, the less the capacitance between the fourth comb structure 115b and the fourth fingers 116b—the less the capacitance of the fourth comb capacitor 114b.

The differential between the capacitance C1 of the third comb capacitor 111b and capacitance C2 of the fourth comb capacitor 114b is an output indicative of the amount of upward or downward movement of the membrane 120. This differential varies linearly with the displacement of the membrane 120 in the z-direction and therefore varies linearly with atmospheric pressure being sensed by the pressure sensor 100.

A fifth comb capacitor 111c is contained within the outer frame portion 110c adjacent sidewall 109a and a sixth comb capacitor 114c is contained within the outer frame portion 110c adjacent sidewall 109b.

The fifth comb capacitor 111c includes a fifth comb structure 112c spaced apart from the sidewall 109a and fifth fingers 113c extending from the sidewall 109a toward the fifth comb structure 112c and interlaced therewith. The fifth comb structure 112c is fixedly carried atop the substrate 300. The capacitance of the fifth comb capacitor 111c is set by the area overlap between adjacent ones the fifth fingers 113c and comb-fingers of the fifth comb structure 112c. The farther the fifth comb structure 112c is from the sidewall 109a, the less the capacitance between the fifth comb structure 112c and the fifth fingers 113c—the less the capacitance of the fifth comb capacitor 111c. Conversely, the closer the fifth comb structure 112c is to the sidewall 109a, the greater the capacitance between the fifth comb structure 111c and the fifth fingers 113c—the greater the capacitance of the fifth comb capacitor 111c.

The sixth comb capacitor 114c includes a sixth comb structure 115c spaced apart from the sidewall 109b and sixth fingers 116c extending from the sidewall 109b toward the sixth comb structure 115c and interlaced therewith. The sixth comb structure 115c is fixedly carried atop the substrate 300. The capacitance of the sixth comb capacitor 114c is set by the area overlap between adjacent ones the sixth fingers 116c and comb-fingers of the sixth comb structure 115c. The farther the sixth comb structure 115c is from the sidewall 109b, the less the capacitance between the sixth comb structure 115c and the sixth fingers 116c—the less the capacitance of the sixth comb capacitor 114c.

The differential between the capacitance C1 of the fifth comb capacitor 111c and capacitance C2 of the sixth comb capacitor 114c is an output indicative of the amount of upward or downward movement of the membrane 120. This differential varies linearly with the displacement of the membrane 120 in the z-direction and therefore varies linearly with atmospheric pressure being sensed by the pressure sensor 100.

A seventh comb capacitor 111d is contained within the outer frame portion 110d adjacent sidewall 109a and an eighth comb capacitor 114d is contained within the outer frame portion 110d adjacent sidewall 109b.

The seventh comb capacitor 111d includes a seventh comb structure 112d spaced apart from the sidewall 109a and seventh fingers 113d extending from the sidewall 109a toward the seventh comb structure 112d and interlaced therewith. The seventh comb structure 112d is fixedly carried atop the substrate 300. The capacitance of the seventh comb capacitor 111d is set by the area overlap between adjacent ones the seventh fingers 113d and comb-fingers of the seventh comb structure 112d. The farther the seventh comb structure 112d is from the sidewall 109a, the less the capacitance between the seventh comb structure 111d and the seventh fingers 113d—the less the capacitance of the seventh comb capacitor 111d. Conversely, the closer the seventh comb structure 112d is to the sidewall 109a, the greater the capacitance between the seventh comb structure 111d and the seventh fingers 113d—the greater the capacitance of the seventh comb capacitor 111d.

The eighth comb capacitor 114d includes an eighth comb structure 115d spaced apart from the sidewall 109b and eighth fingers 116d extending from the sidewall 109b toward the eighth comb structure 115b and interlaced therewith. The eighth comb structure 115d is fixedly carried atop the substrate 300. The capacitance of the eighth comb capacitor 114d is set by the area overlap between adjacent ones the eighth fingers 116d and comb-fingers of the eighth comb structure 115d. The farther the eighth comb structure 115d is from the sidewall 109b, the less the capacitance between the eighth comb structure 115d and the eighth fingers 116d—the less the capacitance of the eighth comb capacitor 114d.

The differential between the capacitance C1 of the seventh comb capacitor 111d and capacitance C2 of the eighth comb capacitor 114d is an output indicative of the amount of upward or downward movement of the membrane 120. This differential varies linearly with the displacement of the membrane 120 in the z-direction and therefore varies linearly with atmospheric pressure being sensed by the pressure sensor 100.

Before continuing, it is to be understood that the pressure sensor 100 would be operational with but one set of comb capacitors.

Figure 8:
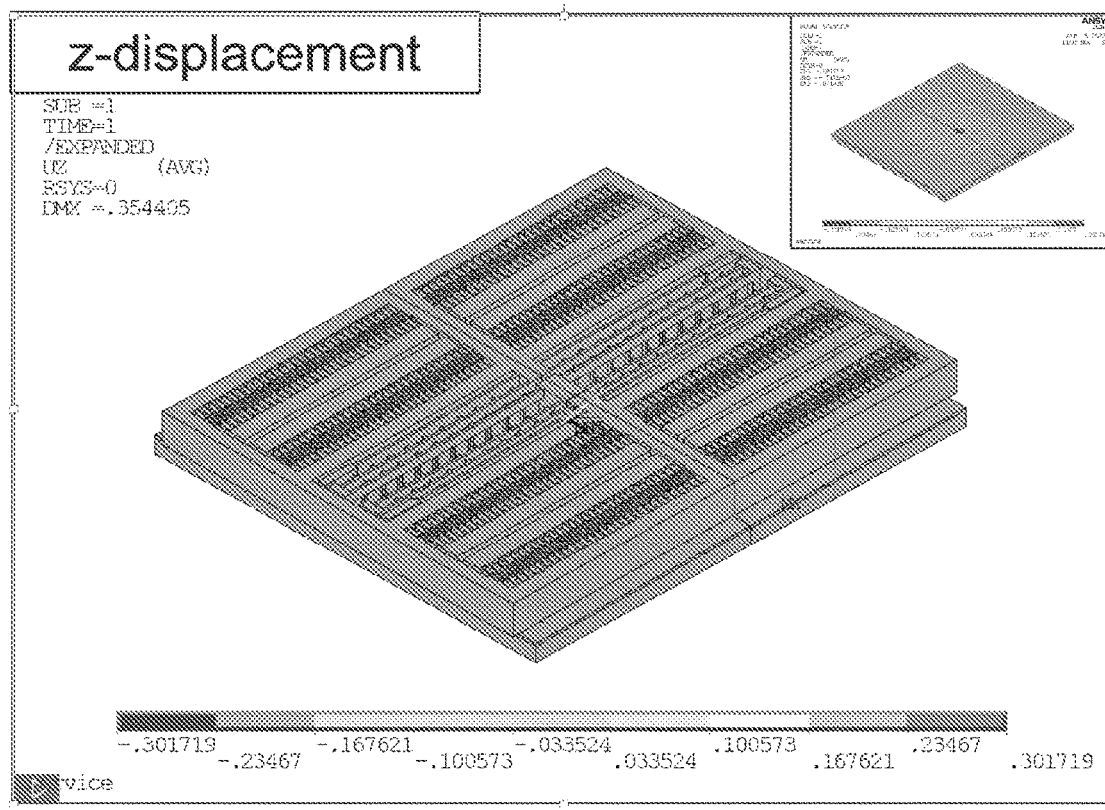
FIGS. 8-10 are perspective diagrammatical views of the pressure sensor of FIG. 2 in operation showing the effect of displacement of the central segment along the z-axis.
Figure 9:
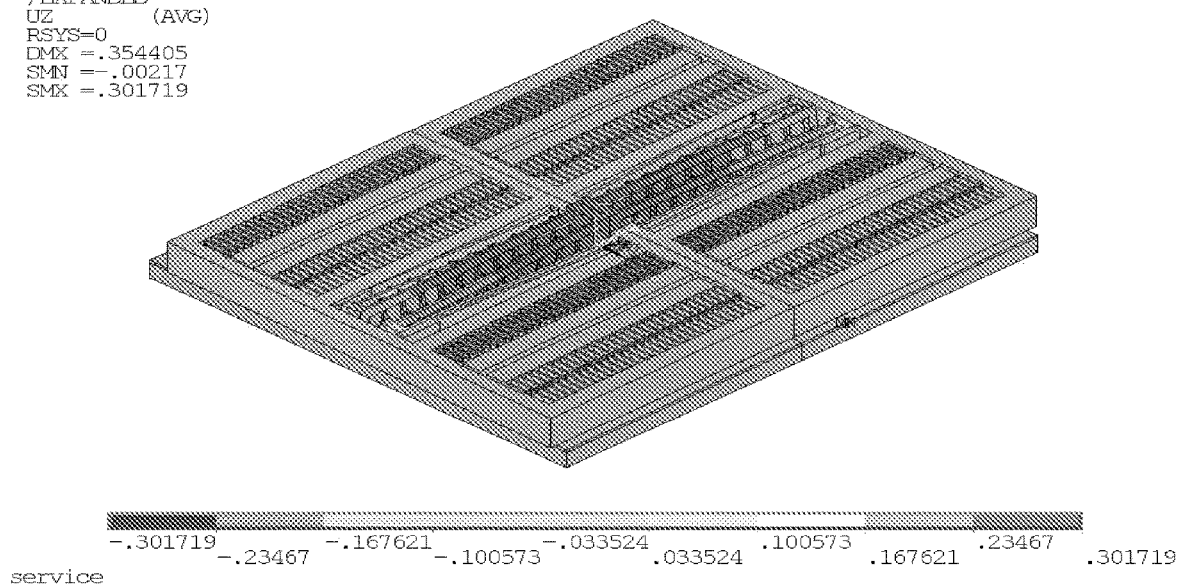
Figure 10:
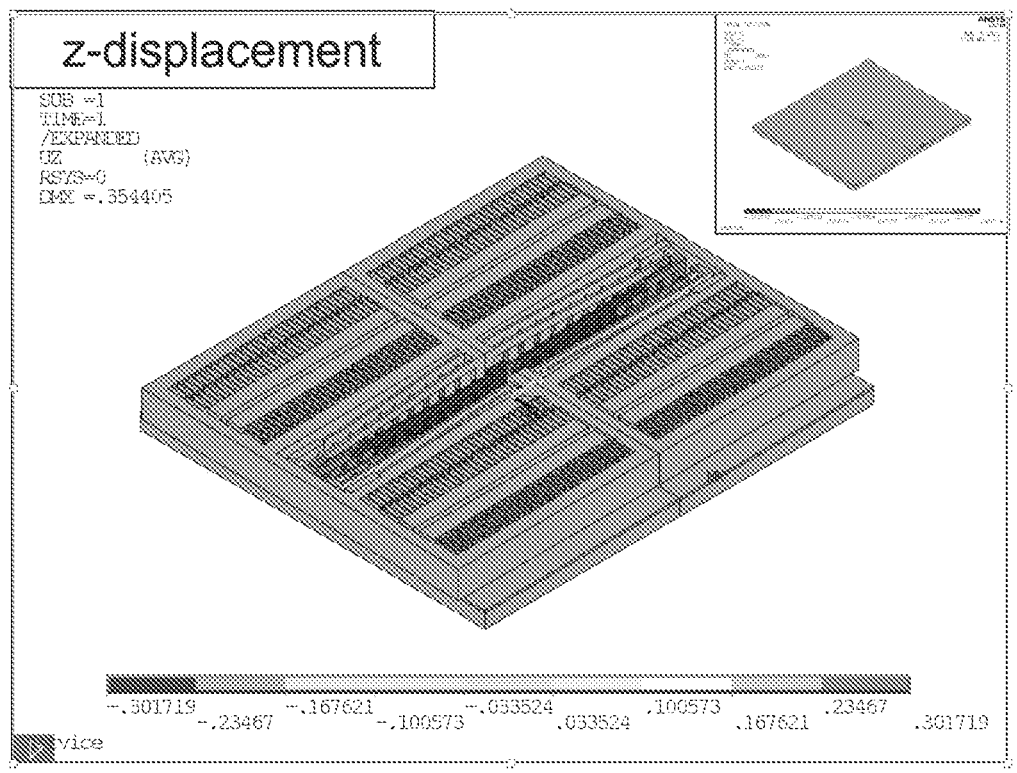
Figure 11:
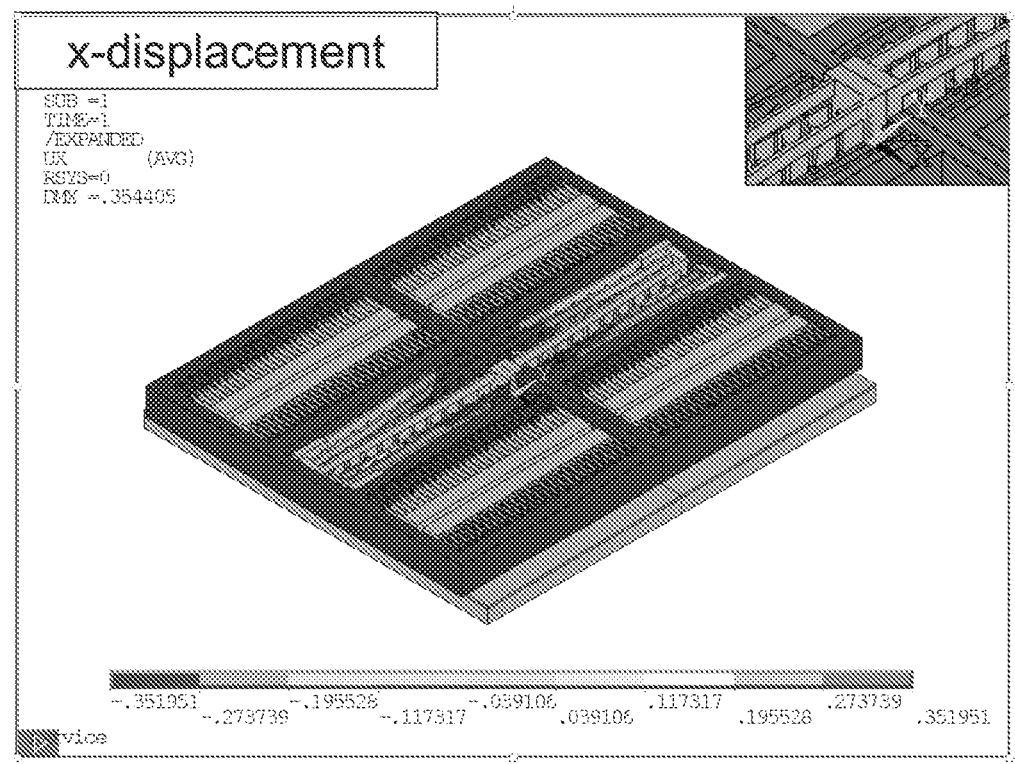
FIGS. 11-13 are perspective diagrammatical views of the pressure sensor of FIG. 2 in operation showing the translation of displacement of the central segment along the z-axis to displacement of the frame with respect to the substrate along the x-axis.
Figure 12:
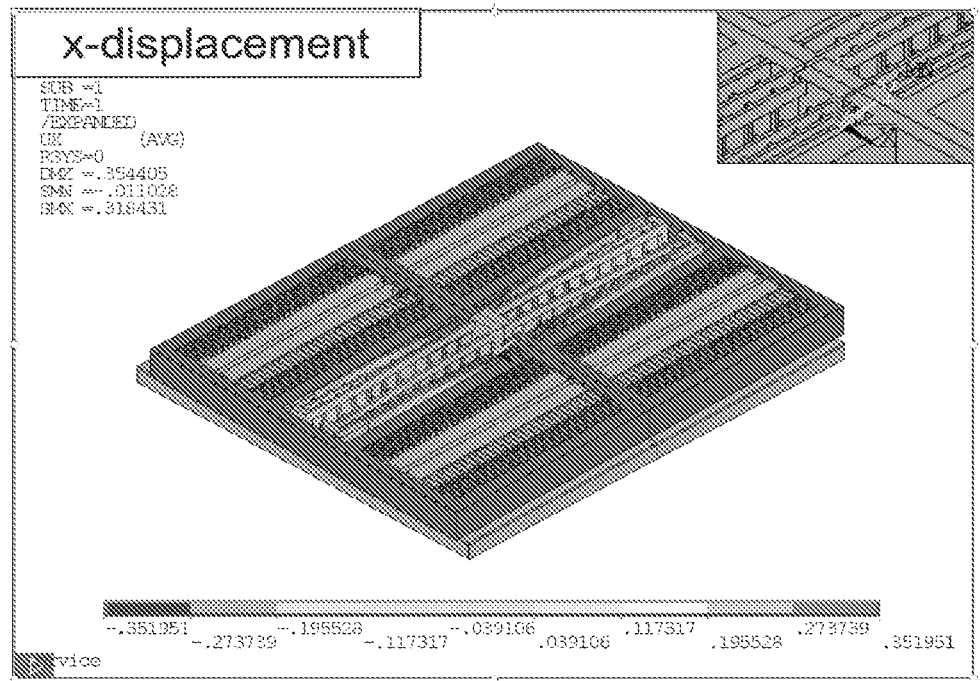
Figure 13:
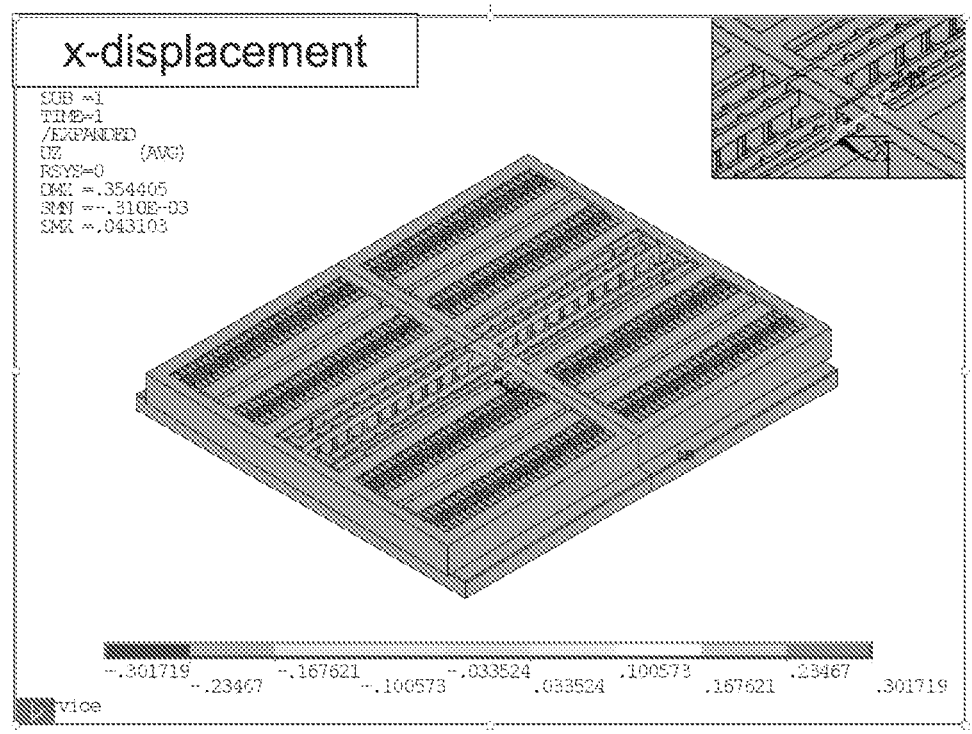

Full operation of the pressure sensor 100 is described. External air enters the chamber 181 through the exposed hole 180 and pushes upwardly on the membrane 120. Upward movement of the membrane 120 results in upward movement of the central segment 109f due to the mechanical connection between the piston 201, membrane 120, and segment 109f, as shown in FIGS. 8-9. Downward movement of the membrane 120 likewise results in downward movement of the central segment 109f, as shown in FIGS. 8 and 10.

Upward or downward movement of the central segment 109f is translated into lateral movement of the frame 110 with respect to the substrate 300 by the action of the spring structures 130 and 135, as shown in FIGS. 11-13 and 17-19, while at the same time the frame 110 is constrained from out-of-plane movement by the spring portions 195 and 196.

Figure 17:
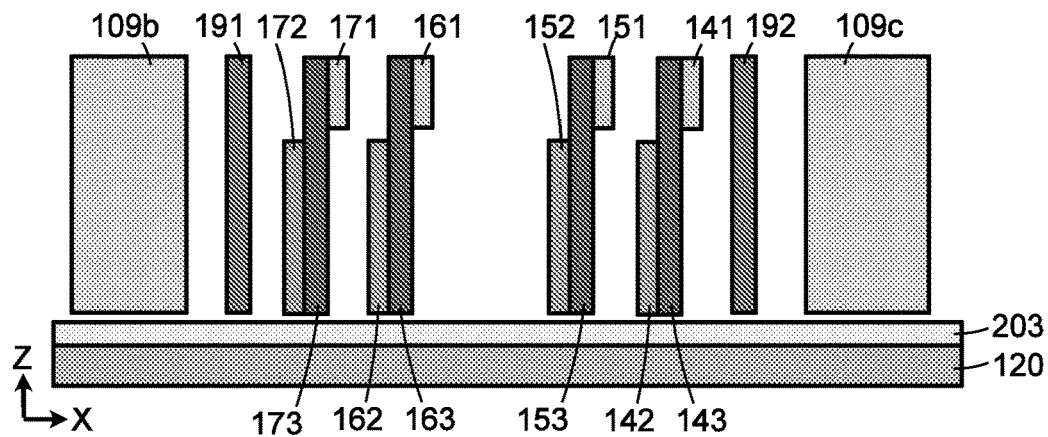
FIGS. 17-19 are cross sectional views of the springs of the pressure sensor of FIG. 2 in operation showing how the springs translate displacement of the central segment along the z-axis to displacement of the frame with respect to the substrate along the x-axis.
Figure 18:
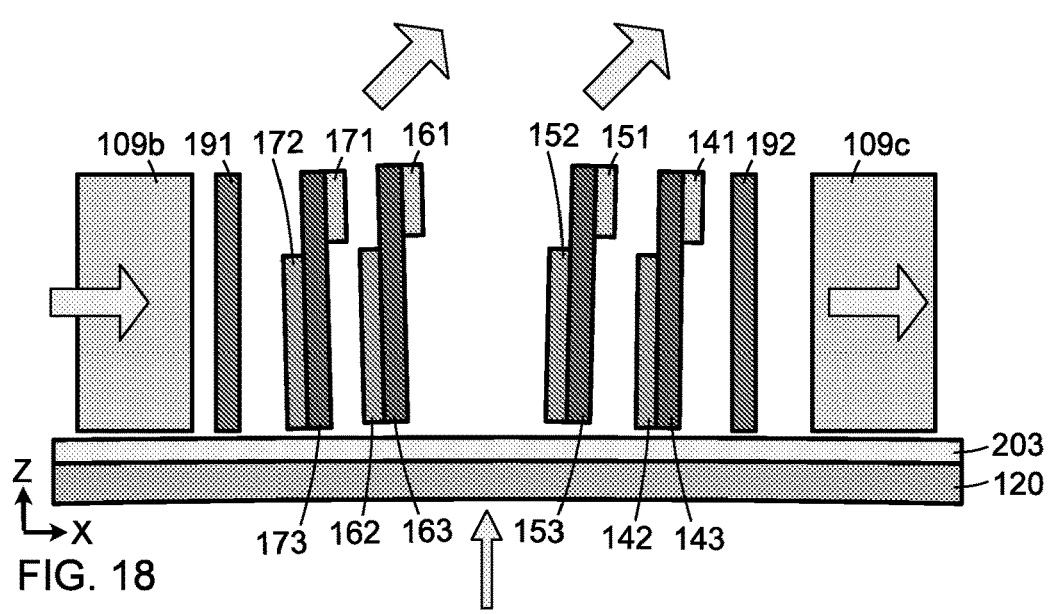
Figure 19:
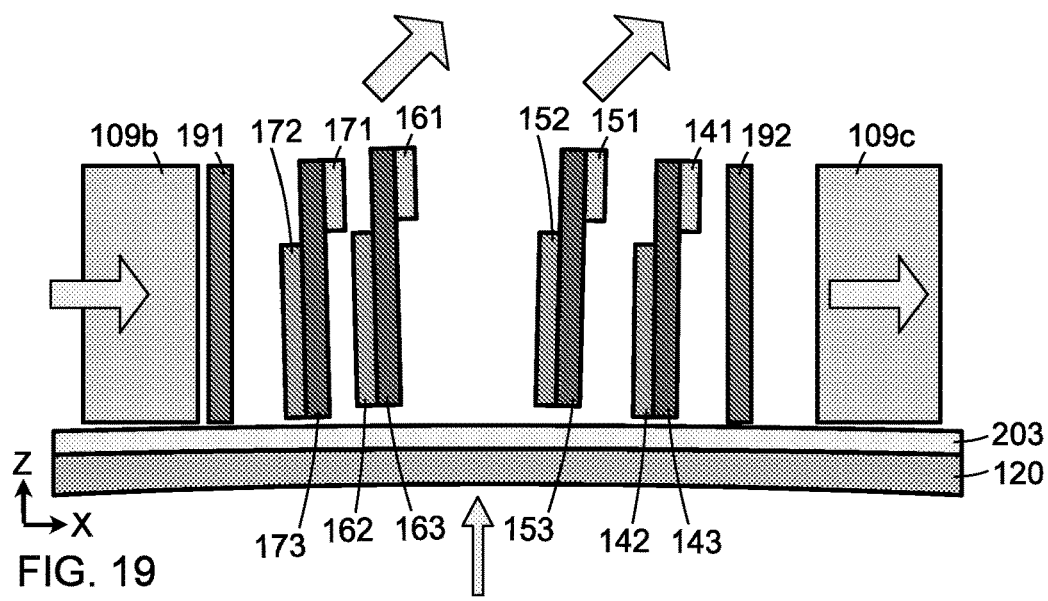

The action of the springs 140, 150, 160, 170 of the spring structures 130 and 135 can be observed in the series of FIGS. 17-19. In FIG. 17, the membrane 120 has not yet been urged upward by the difference in pressure between the internal sealed cavity 204 and external air pressure. In FIG. 18, the membrane 120 has been urged upward, with the result being that the springs 150 and 160 are urged in the positive ZX direction, while the springs 140 and 170 are urged mostly in the positive X direction, with a small amount of movement in the positive Z direction taking place. Since the spring portions 191 and 192 constrain movement of the frame 110 from out-of-plane movement (e.g., Z-direction movement), the force applied to the frame 110 by the springs 140 and 170 is therefore in the positive X direction, causing movement of the frame 110 with respect to the underlying substrate 300. FIG. 19 shows further urging upward of the membrane 120 and the result of additional movement of the frame 110 in the positive X direction with respect to the underlying substrate 300.

Movement of the frame 110 with respect to the substrate 300 changes the capacitance of the comb capacitors 111a and 114a, in turn changing the differential between the capacitance C1 of the first comb capacitor 111a and capacitance C2 of the second comb capacitor 114a. Movement of the frame 110 with respect to the substrate 300 likewise changes the capacitance of the comb capacitors 111b, 111c, 111d and 114b, 114c, 114d, in turn changing the respective differentials between those capacitances. These differentials are outputs indicative of the amount of movement of the frame 110 with respect to the substrate 300. Since upward movement of the membrane 120 results from external air pressure, and since the arrangement of the membrane 120, piston 201, central segment 109f, and spring structures 130 and 135 serve to translate upward movement of the membrane 120 into lateral movement of the frame 110 with respect to the substrate 300, the differential between the capacitance of the comb capacitor 111a-111d and capacitance of their corresponding comb capacitors 114a-114d is indicative of external air pressure.

The comb capacitors 111a-111d may be connected in parallel and the comb capacitors 114a-114d may also be connected in parallel such that the comb capacitors 111a-111d may be read out as a single capacitor, the comb capacitors 114a-114d may be read out as another single capacitor, and therefore the capacitance differential may be read out as a single value. As an alternative, each comb capacitor 111a-111d and 114a-114d may be read out separately, producing therefore eight capacitances as output and thus producing four capacitance differentials as output.

Figure 14:
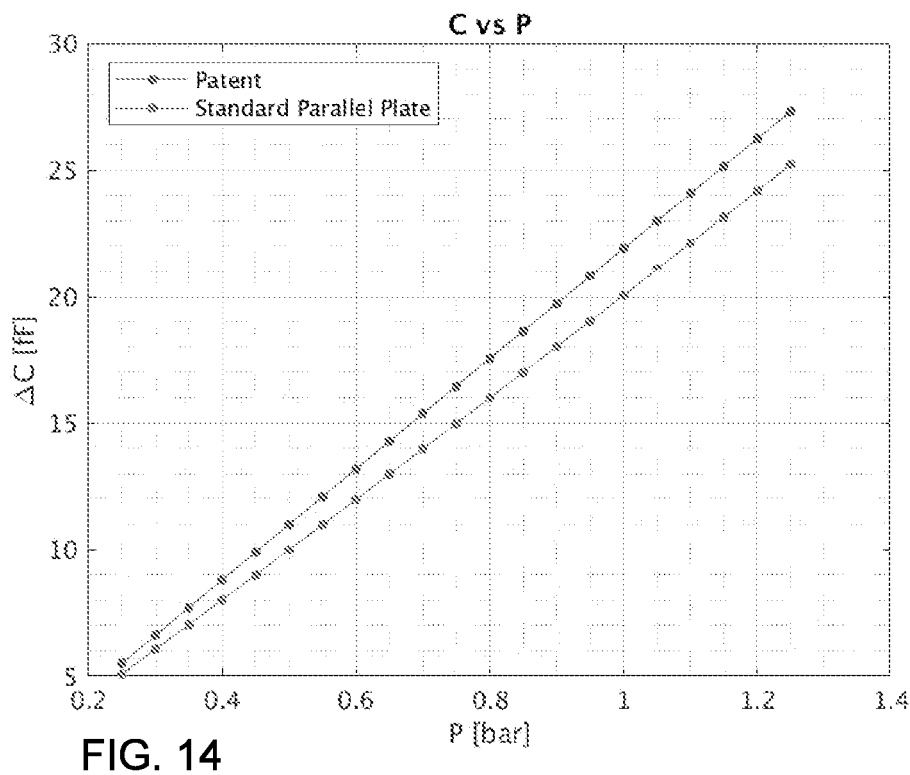
FIG. 14 is a graph of capacitance vs pressure for the pressure sensor of FIG. 2 as compared to a prior art pressure sensor.
Figure 15:
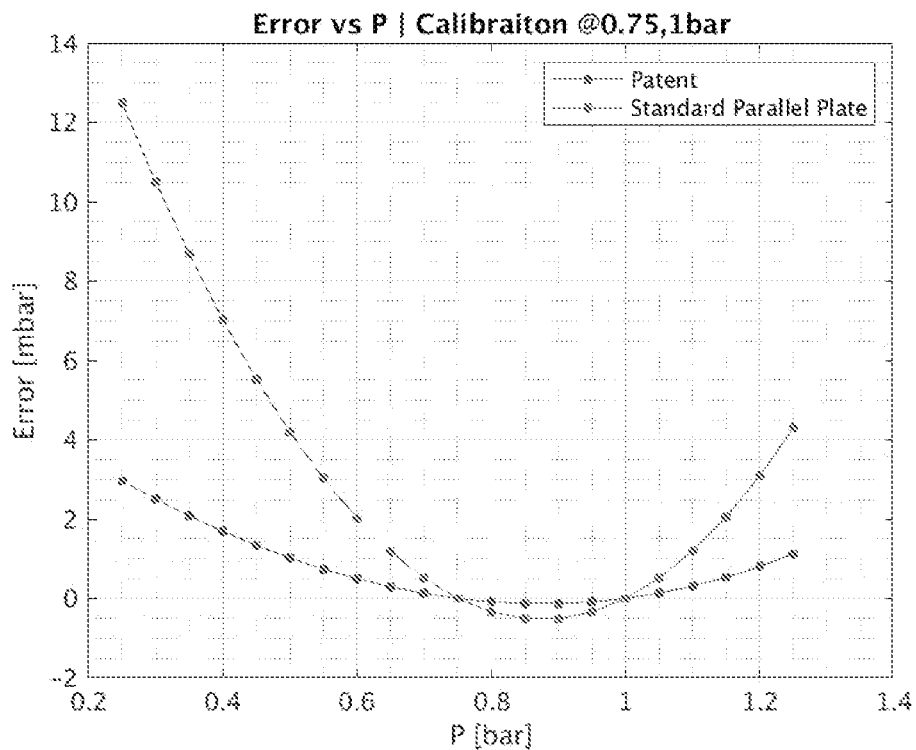
FIG. 15 is a graph of error vs pressure for the pressure sensor of FIG. 2 as compared to a prior art pressure sensor.

The capacitance of comb capacitors varies linearly with the area overlap between the comb and fingers, and therefore the use of the comb capacitors 111a-111d and 114a-1114d allows for the determination of external air pressure from a linear value (the capacitance of the comb capacitors), as opposed to from a non-linear value (the capacitance of parallel plate capacitors) in the prior art. Observe the comparison of the graph of capacitance vs. pressure in FIG. 14 for the pressure sensor 100 described herein (shown as "Patent") and for prior art pressure sensors using parallel plate capacitors (shown as "Standard Parallel Plate")—the graph of capacitance vs. pressure for the pressure sensor 100 is linear, while the graph of capacitance vs. pressure for the prior art pressure sensors is non-linear. Also observe the comparison of the graph of error vs. pressure in FIG. 15 for the pressure sensor 100 described herein (shown as "Patent") and for prior art pressure sensors using parallel plate capacitors (shown as "Standard Parallel Plate")—the error measured over pressure for the pressure sensor 100 is far less than the error measured over pressure for the prior art pressure sensors.

Other benefits provided by the pressure sensor 100 design over prior art sensors is the lack of limitation of membrane displacement (since through sizing of the spring structures 130, 135 and comb capacitors 111a-111d and 114a-1114d a small membrane displacement may be translated to a large comb capacitor displacement), and the lack of the use of a reference capacitor (due to the differential readout provided by the differential arrangements of the comb capacitors 111a-111d and 114a-1114d).

Figure 16:
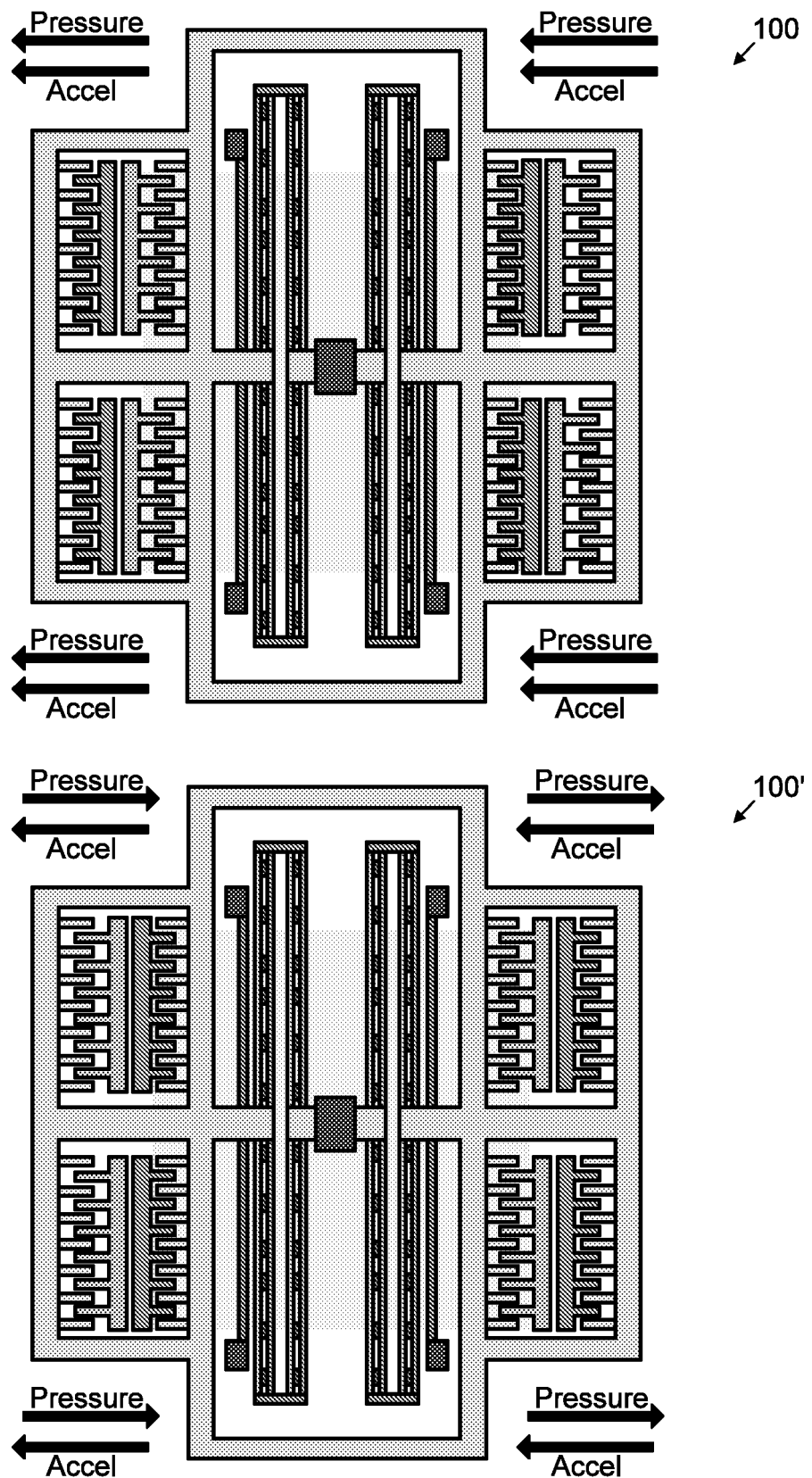
FIG. 16 is a diagrammatical view of a double differential pressure described herein utilizing mirror images of the pressure sensor of FIG. 2 to cancel out the effect of acceleration on readings.

As may be appreciated, an electronic device into which the pressure sensor 100 is incorporated may undergo an acceleration. To provide for compensation for movement of the comb capacitors 111a-111d and 114a-1114d due to acceleration, a pair of pressure sensors 100, 100' may be utilized with the pressure sensor 100' being a mirror image of the pressure sensor 100, as shown in FIG. 16. Therefore, while acceleration results in the same movement of the comb capacitors 111a-111d and 114a-1114d in each pressure sensor 100, 100', air pressure results in opposite movement of the comb capacitors 111a-111d and 114a-1114d between the pressure sensors 100, 100'. As such, through a differential readout of the pressure sensors 100, 100', the effects of acceleration can be cancelled out.

In this embodiment, the pressure sensors 100 and 100' are formed within the same substrate and are positioned within the same sealed cavity, with the chambers of the pressure sensors 100 and 100' being fluidically connected so that the respective membranes of the pressure sensors 100 and 100' are acted upon similarly due to the pressure differential between the chambers and the sealed cavity It is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A pressure sensor, comprising:
a substrate having a cavity defined therein;
a membrane suspended over the cavity;
a passage connecting the cavity to external air pressure such that a change in external air pressure causes out-of-plane movement of the membrane;
a frame slidably suspended over the membrane;
wherein the frame includes: a segment mechanically connected to the membrane and directly mechanically disconnected from other portions of the frame, and at least one projection extending from the frame;
at least one spring structure mechanically connected to the at least one projection and the segment, wherein out-of-plane movement of the membrane applies an out-of-plane force to the at least one spring structure which in turns translates the out-of-plane force to an in-plane force applied to the frame to thereby cause lateral sliding movement of the frame with respect to the substrate; and
a capacitive sensor associated with the frame for detecting sliding in-plane movement of the frame with respect to the substrate.

2. The pressure sensor of claim 1, wherein the at least one spring structure includes a first spring mechanically connected to the at least one projection, a second spring mechanically connected to the segment, and an end portion connecting the first and second springs such that out-of-plane movement of the membrane applies an out-of-plane force to the second spring, the out-of-plane force applied to the second spring in turn being transferred to the first spring by the end portion, the out-of-plane force transferred to the first spring being translated to in-plane force by the first spring and applied to the at least one projection and therefore the frame, the application of the in-plane force to the frame causing lateral sliding movement of the frame with respect to the substrate.

3. The pressure sensor of claim 2, further comprising at least one anchored spring anchored to the substrate and extending over the membrane in a spaced apart fashion thereto to be mechanically connected to the at least one projection, the at least one anchored spring serving to constrain the frame from out-of-plane movement.

4. The pressure sensor of claim 2, wherein the first spring comprises:
a central spring element;
a first side spring element mechanically connected to a first side of the central spring element, the first side spring element extending along the first side of the central spring element from a bottom of the central spring element toward but not reaching a top of the central spring element; and
a second side spring element mechanically connected to a second side of the central spring element opposite to the first side, the second side spring element extending along the second side of the central spring element from the top of the central spring element toward but not reaching the bottom of the central spring element.

5. The pressure sensor of claim 4, wherein the first side spring element extends from the bottom of the central spring element toward and reaching a midpoint of the central spring element along a latitudinal axis of the central spring element; and wherein the second side spring element extends from the top of the central spring element toward and reaching the midpoint of the central spring element along the latitudinal axis of the central spring element.

6. The pressure sensor of claim 1, wherein the capacitive sensor comprises:
a first conductive comb fixedly carried by the substrate; and
a first plurality of conductive fingers fixedly carried by the frame and interdigitated with the first conductive comb such that lateral sliding movement of the frame with respect to the substrate changes an overlap area between the first conductive comb and the first plurality of conductive fingers;
wherein a first capacitance between the first conductive comb and the first plurality of conductive fingers is based upon the out-of-plane movement of the membrane caused by the external air pressure.

7. The pressure sensor of claim 6,
wherein lateral sliding movement of the frame with respect to the substrate in a first direction increases the overlap area between the first conductive comb and the first plurality of conductive fingers; and
further comprising:
a second conductive comb fixedly carried by the substrate; and
a second plurality of conductive fingers fixedly carried by the frame and interdigitated with the second conductive comb such that lateral sliding movement of the frame with respect to the substrate in a second direction opposite to the first direction reduces an overlap area between the second conductive comb and the second plurality of conductive fingers;
wherein a second capacitance between the second conductive comb and the second plurality of conductive fingers is based upon the out-of-plane movement of the membrane caused by the external air pressure; and
wherein the first and second capacitances form a differential capacitance output indicative of the external air pressure.

8. The pressure sensor of claim 6, wherein the frame includes at least one interior portion and at least one exterior portion; wherein the first conductive comb is fixedly carried by the substrate at a location within the at least one exterior portion of the frame; and wherein the first plurality of conductive fingers extend outwardly from an interior sidewall of the at least one exterior portion toward the first conductive comb.

9. The pressure sensor of claim 8, wherein the segment forms part of an interior sidewall of the at least one interior portion of the frame; wherein the at least one projection extends inwardly from an interior sidewall of the at least one interior portion of the frame; and wherein the at least one spring structure is located within the at least one interior portion of the frame.

10. The pressure sensor of claim 9,
wherein the at least one spring structure includes a first spring mechanically connected to the at least one projection, a second spring mechanically connected to the segment, and an end portion connecting the first and second springs such that out-of-plane movement of the membrane applies an out-of-plane force to the second spring, the out-of-plane force applied to the second spring in turn being transferred to the first spring by the end portion, the out-of-plane force transferred to the first spring being translated to in-plane force by the first spring and applied to the at least one projection and therefore the frame, the application of the in-plane force to the frame causing lateral sliding movement of the frame with respect to the substrate.

11. The pressure sensor of claim 1, further comprising a cap positioned over the frame and environmentally sealing the frame and underlying portions from external air, the passage including an opening outside of the cap and exposed to external air.

12. A pressure sensing device, comprising:
a substrate having first and second cavities defined therein;
a passage connecting the first and second cavities to external air pressure;
a first pressure sensor comprising:
a first membrane suspended over the first cavity, wherein a change in external air pressure causes out-of-plane movement of the first membrane;
a first frame slidably suspended over the first membrane;
wherein the first frame includes: a segment mechanically connected to the first membrane and directly mechanically disconnected from other portions of the first frame, and at least one projection extending from the first frame; and
at least one first spring structure mechanically connected to the at least one projection and the segment, wherein out-of-plane movement of the first membrane applies an out-of-plane force to the at least one first spring structure which in turns translates the out-of-plane force to an in-plane force applied to the first frame in a first direction to thereby cause lateral sliding movement of the first frame in the first direction with respect to the substrate; and
at least one first anchored spring anchored to the substrate and extending over the first membrane in a spaced apart fashion thereto to be mechanically connected to the at least one projection, the at least one first anchored spring serving to constrain the first frame from out-of-plane movement; and
a second pressure sensor comprising:
a second membrane suspended over the second cavity, wherein a change in external air pressure causes out-of-plane movement of the second membrane;
a second frame slidably suspended over the second membrane;
wherein the second frame includes: a segment mechanically connected to the second membrane and directly mechanically disconnected from other portions of the second frame, and at least one projection extending from the second frame; and
at least one second spring structure mechanically connected to the at least one projection of the second frame and the segment of the second frame, wherein out-of-plane movement of the second membrane applies an out-of-plane force to the at least one second spring structure which in turns translates the out-of-plane force to an in-plane force applied to the second frame in a second direction opposite to the first direction to thereby cause lateral sliding movement of the second frame in the second direction with respect to the substrate; and
at least one second anchored spring anchored to the substrate and extending over the second membrane in a spaced apart fashion thereto to be mechanically connected to the at least one projection, the at least one second anchored spring serving to constrain the second frame from out-of-plane movement; and
a first capacitive sensor associated with the first frame for detecting sliding in-plane movement of the first frame with respect to the substrate; and
a second capacitive sensor associated with the second frame for detecting sliding in-plane movement of the second frame with respect to the substrate.

13. The pressure sensing device of claim 12,
wherein the at least one first spring structure includes a first spring mechanically connected to the at least one projection extending from the first frame, a second spring mechanically connected to the segment of the first frame, and an end portion connecting the first and second springs such that out-of-plane movement of the first membrane applies an out-of-plane force to the second spring, the out-of-plane force applied to the second spring in turn being transferred to the first spring by the end portion, the out-of-plane force transferred to the first spring being translated to in-plane force by the first spring and applied to the at least one projection extending from the first frame and therefore the first frame, the application of the in-plane force to the first frame causing lateral sliding movement of the first frame in the first direction with respect to the substrate; and wherein the at least one second spring structure includes a first spring mechanically connected to the at least one projection extending from the second frame, a second spring mechanically connected to the segment of the second frame, and an end portion connecting those first and second springs such that out-of-plane movement of the second membrane applies an out-of-plane force to the second spring, the out-of-plane force applied to the second spring in turn being transferred to the first spring by the end portion, the out-of-plane force transferred to the first spring being translated to in-plane force by the first spring and applied to the at least one projection extending from the second frame and therefore the second frame, the application of the in-plane force to the second frame causing lateral sliding movement of the second frame in the second direction with respect to the substrate.

14. The pressure sensing device of claim 13,
wherein the first spring comprises:
   a central spring element;
   a first side spring element mechanically connected to a first side of the central spring element, the first side spring element extending along the first side of the central spring element from a bottom of the central spring element toward but not reaching a top of the central spring element; and
   a second side spring element mechanically connected to a second side of the central spring element opposite to the first side, the second side spring element extending along the second side of the central spring element from the top of the central spring element toward but not reaching the bottom of the central spring element; and
wherein the second spring comprises:
   a central spring element;
   a first side spring element mechanically connected to a first side of the central spring element, the first side spring element extending along the first side of the central spring element from a bottom of the central spring element toward but not reaching a top of the central spring element; and
   a second side spring element mechanically connected to a second side of the central spring element opposite to the first side, the second side spring element extending along the second side of the central spring element from the top of the central spring element toward but not reaching the bottom of the central spring element.

15. The pressure sensing device of claim 14,
wherein, in the first spring: the first side spring element extends from the bottom of the central spring element toward and reaching a midpoint of the central spring element along a latitudinal axis of the central spring element; and the second side spring element extends from the top of the central spring element toward and reaching the midpoint of the central spring element along the latitudinal axis of the central spring element; and
wherein, in the second spring: the first side spring element extends from the bottom of the central spring element toward and reaching a midpoint of the central spring element along a latitudinal axis of the central spring element; and the second side spring element extends from the top of the central spring element toward and reaching the midpoint of the central spring element along the latitudinal axis of the central spring element.

16. The pressure sensing device of claim 12,
wherein the first capacitive sensor comprises:
   a first conductive comb fixedly carried by the substrate; and
   a first plurality of conductive fingers fixedly carried by the first frame and interdigitated with the first conductive comb such that lateral sliding movement of the first frame with respect to the substrate changes an overlap area between the first conductive comb and the first plurality of conductive fingers;
   wherein a first capacitance between the first conductive comb and the first plurality of conductive fingers is based upon the out-of-plane movement of the first membrane caused by the external air pressure; and
wherein the second capacitive sensor comprises:
   a second conductive comb fixedly carried by the substrate; and
   a second plurality of conductive fingers fixedly carried by the second frame and interdigitated with the second conductive comb such that lateral sliding movement of the second frame with respect to the substrate changes an overlap area between the second conductive comb and the second plurality of conductive fingers;
   wherein a second capacitance between the second conductive comb and the second plurality of conductive fingers is based upon the out-of-plane movement of the second membrane caused by the external air pressure.

17. The pressure sensing device of claim 12, further comprising a cap positioned over the first and second frames and environmentally sealing the first and second frames and underlying portions from external air, the passage including an opening outside of the cap and exposed to external air.

* * * * *